March 3, 1970  SHUJI KOYANAGI  3,498,698

WIDE-ANGLE OBJECTIVE

Filed June 6, 1966  2 Sheets-Sheet 1

United States Patent Office 3,498,698
Patented Mar. 3, 1970

3,498,698
WIDE ANGLE OBJECTIVE
Shuji Koyanagi, Tokyo, Japan, assignor to Canon Camera Kabushiki Kaisha, Tokyo, Japan, a corporation of Japan
Filed June 6, 1966, Ser. No. 559,636
Claims priority, application Japan, Aug. 6, 1965, 40/47,809
Int. Cl. G02b 9/62
U.S. Cl. 350—215    1 Claim

ABSTRACT OF THE DISCLOSURE

The present invention provides a photographic wide angle objective of six components separated by air spaces. The first component facing the object field and the second component are negative meniscus lenses, the respective outer surfaces of which are convex toward the object field. The third and fourth components are positive complex cemented lenses respectively, each composed of at least three lens elements. The fifth component is a simple or complex cemented lens, the front surface being convex towards the object field, while the last or sixth component is a low powered positive or negative complex cemented lens composed of at least two lens elements. By this arrangement, not only the aberrations of astigmatism, curvature of field and distortion are finely corrected, but also coma is corrected, so that when very small objects are photographed, the contrast in the focused image will not deteriorate.

---

Figure 1:
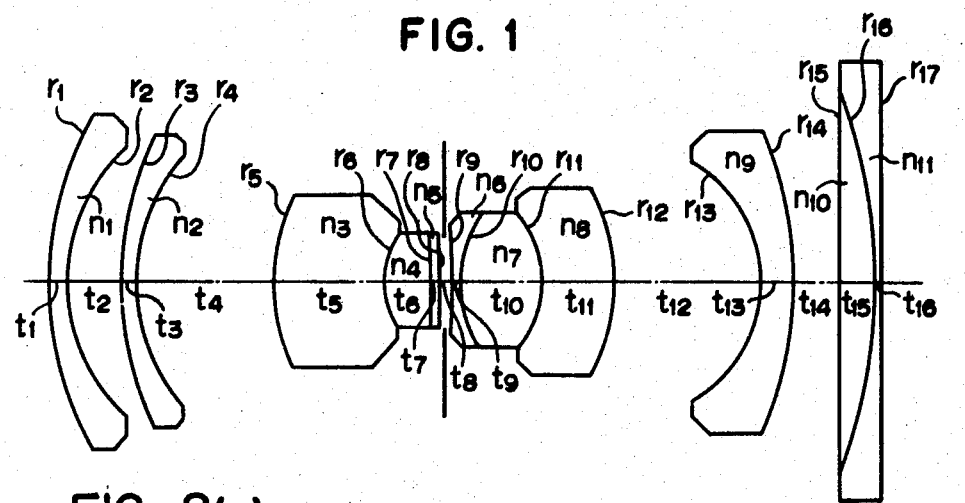
Figure 2A:
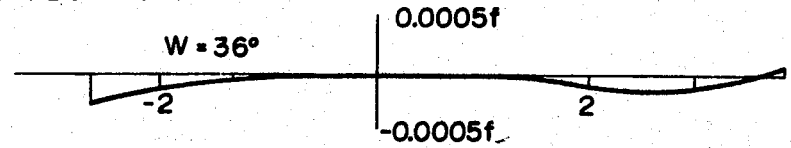
Figure 2B:
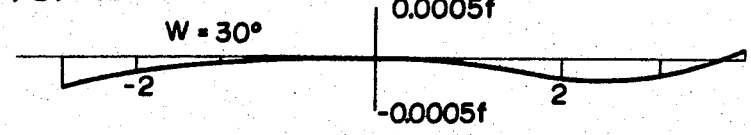
Figure 2C:
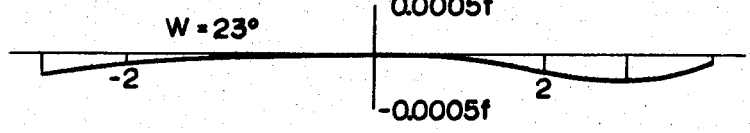
Figure 2D:
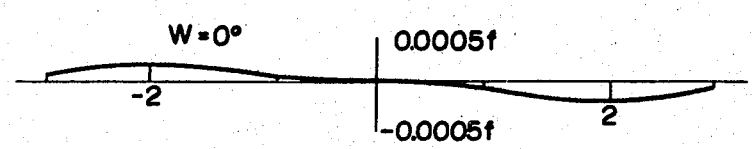

This invention relates to an improved photographic wide-angle objective.

Considering wide-angle objectives generally, substantially the aberrations of astigmatism, curvature of field and distortion should inherently be highly corrected. Moreover, in special cases of usage such as photocopying, minimization of these aberrations, in wide-angle objectives is necesary, and fine correction of the other aberrations is also needed. Furthermore, coma should be highly corrected in order not to weaken the contrast in the focused image, as well as the above mentioned three aberrations in order to photograph very small objects in the same plane. However, very few wide-angle objectives satisfying such requirements have been developed.

An object of the invention is to provide a wide-angle objective, in which the curvature of field and coma in particular are highly corrected, and in which the curvature of field is brought less than about $\pm 0.00055f$ and coma less than about $\pm 0.0003f$, in every image point of the objective with an $f$-number of 5.6 and a field angle (2W) of 72°. Therefore the invention results in a suitable means to take detailed fine photographs such as documentation photographs. It should be noted that the nomenclature $f$ denotes the over-all focal length of the wide-angle objective.

Another object of the invention is to provide a wide-angle objective in which the curvature of field, coma and flare are small, the spherical aberrations, astigmatism and chromatic aberrations are well corrected, and yet sufficient zonal light is transmitted that is quite satisfactory for a wide-angle objective in which a focused image with very good contrast is to be expected.

Another object of the invention is to provide a wide-angle objective with which the size of the photocopying camera system is made smaller for the same field range.

Still another object of the invention is to provide a wide-angle objective of small variations of aberrations because of the good arrangement in the last component of the objective of the variation of the curvature of the field due to manufacturing and assembling errors of wide-angle objectives consisting of a plurality of members, especially the thickness of each lens element and each air lens, and to provide a wide-angle objective in which minimization of ghosts due to internal reflection is provided since air facing lens elements are few, and in which the minimization of aberrations due to eccentric assembly which is so necessary for wide-angle objectives is also provided.

Figure 3A:
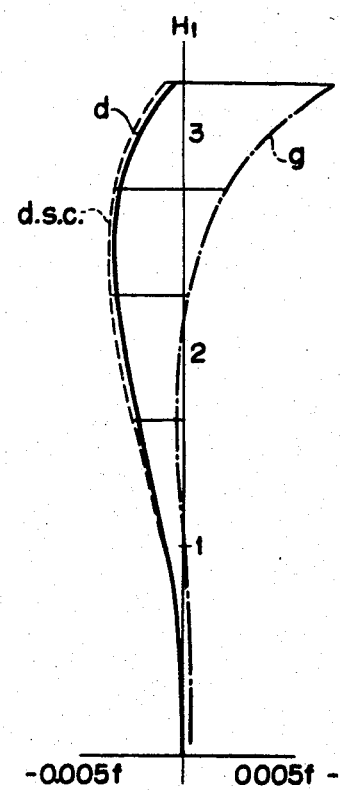
Figure 3B:
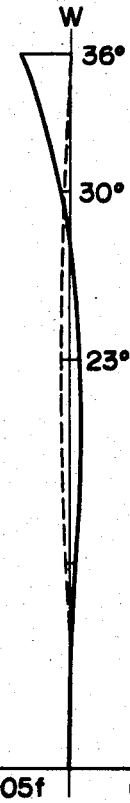
Figure 3C:
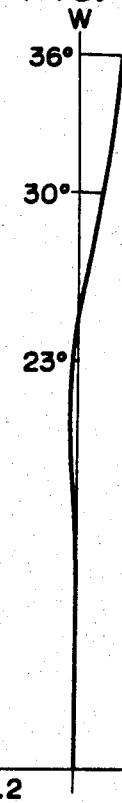

Other objects, advantages and features of this invention will become more apparent from the following description of an illustrative embodiment in conjunction with the drawing in which:

FIG. 1 represents cross sectional view of a wide-angle objective according to the invention;

FIGS. 2(a) to 2(d) illustrate the aberration curves of meridional coma of the embodiment shown in FIG. 1; and FIGS. 3(a) to 3(c) illustrate the other aberration curves of the embodiment shown in FIG. 1.

The wide-angle objective according to the invention consists of six components separated by air spaces, the first component facing the object field and the second component each being negative meniscus lens, the respective outer surfaces of which are convex towards the object field, the third and the fourth components being positive complex cemented lens respectively, each composed of more than three lens elements, the fifth component being a simple complex cemented lens, the front surface of which being concave towards the object field, the last component being a low powered positive or negative complex cemented lens composed of more than two lens elements.

An example of above invention consisting of six components, of which the third and the fourth are composed of three lens elements, the fifth being a simple lens and the last being composed of two lens elements, is now described in the formulae of necessary and satisfactory condition with the help of symbols or nomenclatures. The formulae are as follows:

$$n_1 < 1.55$$
$$n_2 < 1.55$$
$$n_3 > 1.7$$
$$1.7 > n_7 > 1.58$$
$$n_9 > 1.62$$
$$V_4 > V_5$$
$$V_{11} > 61$$
$$0.58f > r_2 > 0.4f$$
$$0.55f > r_4 > 0.41f$$
$$0.61f > r_5 > 0.49f$$
$$0.61f > |r_{12}| > 0.49f$$

where:

$r_{\text{subscript}}$ is the radius of curvature of the refracting surface of each lens;
$n_{\text{subscript}}$ is the refractive index for the $d$-line of the used glass;
$V_{\text{subscript}}$ is the Abbe number of each lens; and
$f$ denotes the overall focal length of the embodiment; each subscript meaning the ordered surface or ordered space as shown in FIG. 1.

$n_1 < 1.55$ and $n_2 < 1.55$ are necessary for minimization of the Petzvel sum; $n_3 > 1.7$, as well as $0.61f > r_5 > 0.49f$, is for decreasing the zonal spherical aberration and decreasing coma and flare especially in the central portion of the image field; and $1.7 > n_7 > 1.58$ is to contribute improvement of the spherical aberration, astigmatism and curvature of field; in the outer region of the upper limit of said formula the spherical aberration becomes marked in an objectionable manner and also in the outer region of the lower limit of said formula astigmatism and curvature of field become marked in an objectionable manner. $n_9>1.62$ is a condition just for balancing over-correction of the curvature of field by the conditions $n_1<1.55$ and $n_2<1.55$ (that the Petzval's sum becomes too small) with recorrection. And the above mentioned condition, $n_9>1.62$ as well as $0.58f>r_2>9.4f$ and $0.55f>r_4>0.41f$, is for correcting and balancing coma, so-called flare and distortion in the over-all range of the field.

$$0.61f>|r_{12}|>0.49f$$

is just for balancing spherical aberrations and distortion. The conditions $V_4>V_5$ and $V_{11}>61$ are necessary to balance longitudinal and lateral chromatic aberrations, which are uneasy to be corrected in case of wide-angle objectives.

The mathematical data of one embodiment of the illustrative embodiment of the invention is below given; FIG. 1 representing the composition of said embodiment of which the numerical values are as follows:

$$[f=1 \quad F{:}5.6 \quad 2W=72°]$$

| | | | |
|---|---|---|---|
| $r_1=1.0092$ | $t_1=0.0384$ | $n_1=1.50048$ | $v_1=65.9$ |
| $r_2=0.4817$ | $t_2=0.1362$ | | |
| $r_3=0.9586$ | $t_3=0.0411$ | $n_2=1.48749$ | $v_2=70.0$ |
| $r_4=0.4897$ | $t_4=0.3553$ | | |
| $r_5=0.5419$ | $t_5=0.2830$ | $n_3=1.71300$ | $v_3=53.9$ |
| $r_6=0.2447$ | $t_6=0.1131$ | $n_4=1.60729$ | $v_4=59.5$ |
| $r_7=-1.3703$ | $t_7=0.0192$ | $n_5=1.60717$ | $v_5=40.2$ |
| $r_8=-1.8791$ | $t_8=0.0345$ | | |
| $r_9=-2.8252$ | $t_9=0.0274$ | $n_6=1.57250$ | $v_6=57.5$ |
| $r_{10}=0.2865$ | $t_{10}=0.2137$ | $n_7=1.62230$ | $v_7=53.1$ |
| $r_{11}=-0.2465$ | $t_{11}=0.1753$ | $n_8=1.71736$ | $v_8=29.5$ |
| $r_{12}=-0.5803$ | $t_{12}=0.3772$ | | |
| $r_{13}=-0.3901$ | $t_{13}=0.0926$ | $n_9=1.64850$ | $v_9=53.0$ |
| $r_{14}=-1.1741$ | $t_{14}=0.1260$ | | |
| $r_{15}=\infty$ | $t_{15}=0.0876$ | $n_{10}=1.50013$ | $v_{10}=63.2$ |
| $r_{16}=-1.4786$ | $t_{16}=0.0164$ | $n_{11}=1.50048$ | $v_{11}=65.9$ |
| $r_{17}=\infty$ | | | |

Each $t_{subscript}$ of the above notations represents the thickness of lens on the optical axis and the thickness of air gap on the optical axis. FIG. 2 and FIG. 3 show the aberration curves of said embodiment at a magnification factor of 13.6. FIG. 2 shows the meridional coma with a parameter W of half the angle of the field. FIG. 3($a$) shows the spherical aberration (continuous line), the sine condition (short dashed line) and the chromatic aberration (chain line); FIG. 3($b$) shows astigmatism, the sagittal in the continuous line and the meridional in the short dashed line, and FIG. 3($c$) the distortion curve.

The additional description of the aberration coefficients of the third order (with * prepositioned) and the fifth order, at a magnification factor of 13.6, is as follows:

| | |
|---|---|
| Zone spherical | −858.1484 |
| Zonal comatic | −15.9873 |
| Additional zonal comatic | 0.2579 |
| Spherical* | 2.6620 |
| Peripheral spherical | −14.4588 |
| Wing shape spherical | −2.2541 |
| Additional spherical | 2.6255 |
| Comatic* | 0.1187 |
| Peripheral comatic | −0.8245 |
| Arrow shape comatic | 0.874 |
| Additional comatic | 0.2333 |
| Astigmatism* | 0.0111 |
| Sagittal curvature of field (or image)* | −0.0185 |
| Peripheral astigmatism | −0.1261 |
| Peripheral sagittal curvature of field (or image) | 0.3112 |
| Distortion* | 0.0095 |
| Peripheral distortion | −0.1900 |
| Petzval's sum* | −0.0296 |
| Longitudinal chromatic aberration* | −0.0011 |
| Lateral chromatic aberration* | 0.0005 |

The uncorrected aberrations, as clearly shown above, are small: the comatic aberration is less than $$+0.0001f \sim -0.00025f$$

at every image point of the full angle of field, and the curvature of field is less than $\pm 0.00055f$, with the exceptional value of the sagittal aberration $-0.0025f$ at the widest field angle.

What is claimed is:

1. A wide angle objective of six components separated by air spaces, the first and second components being negative meniscus lenses with their convex surfaces facing toward the object field; the third and fourth components being positive complex lenses each composed of three elements, the fifth component being a meniscus lens with the convex surface facing the image field, and the sixth element being a low powdered complex lens composed of two lens elements, the objective having the following numerical data:

$$[f=1 \quad F{:}5.6 \quad 2W=72°]$$

| | | | |
|---|---|---|---|
| $r_1=1.0092$ | $t_1=0.0384$ | $n_1=1.50048$ | $v_1=65.9$ |
| $r_2=0.4817$ | $t_2=0.1362$ | | |
| $r_3=0.9586$ | $t_3=0.0411$ | $n_2=1.48749$ | $v_2=70.0$ |
| $r_4=0.4897$ | $t_4=0.3553$ | | |
| $r_5=0.5419$ | $t_5=0.2830$ | $n_3=1.71300$ | $v_3=53.9$ |
| $r_6=0.2447$ | $t_6=0.1131$ | $n_4=1.60729$ | $v_4=59.5$ |
| $r_7=-1.3703$ | $t_7=0.0192$ | $n_5=1.60717$ | $v_5=40.2$ |
| $r_8=-1.8791$ | $t_8=0.0345$ | | |
| $r_9=-2.8252$ | $t_9=0.0274$ | $n_6=1.57250$ | $v_6=57.5$ |
| $r_{10}=0.2865$ | $t_{10}=0.2137$ | $n_7=1.62230$ | $v_7=53.1$ |
| $r_{11}=-0.2465$ | $t_{11}=0.1753$ | $n_8=1.71736$ | $v_8=29.5$ |
| $r_{12}=-0.5803$ | $t_{12}=0.3772$ | | |
| $r_{13}=-0.3901$ | $t_{13}=0.0926$ | $n_9=1.64850$ | $v_9=53.0$ |
| $r_{14}=-1.1741$ | $t_{14}=0.1260$ | | |
| $r_{15}=\infty$ | $t_{15}=0.0876$ | $n_{10}=1.50013$ | $v_{10}=63.2$ |
| $r_{16}=-1.4786$ | $t_{16}=0.0164$ | $n_{11}=1.50048$ | $v_{11}=65.9$ | where $r_{subscript}$ is the radius of curvature of the refracting surface of the particular lens, $t_{subscript}$ represents the thickness of the successive lenses and width of the successive air gaps on the optical axis, $n_{subscript}$ is the refractive index for $d$-line of the lens glass, $V_{subscript}$ is Abbe number of the respective lens, and $f$ denotes the over-all focal length of the objective, the value of each subscript being in the order of the surface space from the objective to the image side of the objective.

References Cited

UNITED STATES PATENTS

| | | | |
|---|---|---|---|
| 2,734,424 | 2/1956 | Bertele | 350—215 |
| 2,830,495 | 4/1958 | Koch et al. | 350—215 X |
| 3,039,361 | 6/1962 | Baker | 350—215 X |

JOHN K. CORBIN, Primary Examiner